United States Patent
Prasad

(10) Patent No.: US 11,825,384 B2
(45) Date of Patent: Nov. 21, 2023

(54) ACCESS AGNOSTIC DELIVERY OF BROADCAST, MULTICAST, OR UNICAST CONTENT

(71) Applicant: Nokia Solutions and Networks Oy, Espoo (FI)

(72) Inventor: Athul Prasad, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 355 days.

(21) Appl. No.: 16/759,496

(22) PCT Filed: Sep. 20, 2018

(86) PCT No.: PCT/US2018/051994
§ 371 (c)(1),
(2) Date: Dec. 16, 2020

(87) PCT Pub. No.: WO2019/083649
PCT Pub. Date: May 2, 2019

(65) Prior Publication Data
US 2021/0112378 A1 Apr. 15, 2021

Related U.S. Application Data

(63) Continuation of application No. 15/796,247, filed on Oct. 27, 2017, now abandoned.

(51) Int. Cl.
*H04W 4/06* (2009.01)
*H04L 65/80* (2022.01)
(Continued)

(52) U.S. Cl.
CPC ........... *H04W 4/06* (2013.01); *H04L 41/0816* (2013.01); *H04L 43/16* (2013.01); *H04L 65/611* (2022.05);
(Continued)

(58) Field of Classification Search
CPC ..... H04W 4/06; H04W 56/001; H04W 88/02; H04L 41/0816; H04L 43/16; H04L 65/4076; H04L 65/604; H04L 65/80
(Continued)

(56) References Cited

U.S. PATENT DOCUMENTS 9,620,171 B2 * 4/2017 Kapa, Jr. ............... G11B 27/034
2009/0175183 A1 * 7/2009 Mochizuki ........ H04W 36/0007
370/332

(Continued)

FOREIGN PATENT DOCUMENTS

| EP | 2903325 A1 | 8/2015 |
|----|------------|--------|
| WO | 2013182247 A1 | 12/2013 |
| WO | 2016029938 A1 | 3/2016 |

OTHER PUBLICATIONS

Extended European Search Report for Application No. 18 793 295.9-1213, dated Jul. 8, 2021, 5 pages.
(Continued)

*Primary Examiner* — Obaidul Huq
(74) *Attorney, Agent, or Firm* — Tong, Rea, Bentley & Kim, LLC

(57) ABSTRACT

A user equipment transmits a request to configure a first network to transmit complementary content associated with multicast or broadcast content received at the user equipment from a second network. In some cases, the request is transmitted in response to the user equipment detecting that a quality of a signal received from the second network is below a threshold. In response to receiving the request, the first network is configured to transmit the complementary content. The complementary content is transmitted from the first network concurrently with transmitting the multicast or broadcast content from the second network. The user equipment combines the complementary content received from
(Continued)

the first network with the multicast or broadcast content received from the second network.

25 Claims, 13 Drawing Sheets

(51) Int. Cl.
*H04L 65/611* (2022.01)
*H04L 65/75* (2022.01)
*H04L 41/0816* (2022.01)
*H04L 43/16* (2022.01)
*H04W 56/00* (2009.01)
*H04W 88/02* (2009.01)

(52) U.S. Cl.
CPC ............ *H04L 65/764* (2022.05); *H04L 65/80* (2013.01); *H04W 56/001* (2013.01); *H04W 88/02* (2013.01)

(58) Field of Classification Search
USPC .................................................. 370/241, 252
See application file for complete search history.

(56) References Cited

U.S. PATENT DOCUMENTS

| | | | |
|---|---|---|---|
| 2010/0263012 A1 | 10/2010 | Huang et al. | |
| 2011/0019589 A1* | 1/2011 | Li | H04H 20/42 |
| | | | 370/255 |
| 2013/0163463 A1* | 6/2013 | Grayson | H04L 41/12 |
| | | | 370/253 |
| 2013/0235783 A1* | 9/2013 | Wang | H04W 4/06 |
| | | | 370/312 |
| 2015/0201344 A1* | 7/2015 | Wu | H04W 4/06 |
| | | | 370/252 |
| 2016/0359944 A1* | 12/2016 | Yoon | H04L 65/611 |
| 2020/0059894 A1* | 2/2020 | Siomina | H04W 72/0453 |

OTHER PUBLICATIONS

International Preliminary Report on Patentability dated May 7, 2020 for PCT/US2018/051994, 8 pages.

Extended European Search Report for Application No. 18 793 295.9-1213, dated Mar. 6, 2023, 5 pages.

* cited by examiner

ACCESS AGNOSTIC DELIVERY OF BROADCAST, MULTICAST, OR UNICAST CONTENT

CROSS-REFERENCE TO RELATED APPLICATIONS

The present application is a 371 application of PCT Application Serial No. PCT/US2018/051994, entitled "ACCESS AGNOSTIC DELIVERY OF BROADCAST, MULTICAST, OR UNICAST CONTENT" and filed on Sep. 20, 2018, which claims priority to U.S. patent application Ser. No. 15/796,247, entitled "ACCESS AGNOSTIC DELIVERY OF BROADCAST, MULTICAST, OR UNICAST CONTENT" and filed on Oct. 27, 2017, the entirety of which is incorporated by reference herein.

BACKGROUND

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. Future 5G communication systems will therefore be required to support gigabit per second data rates (e.g., to support virtual or augmented reality applications), end-to-end latencies of at most 10 milliseconds (ms) (e.g., to support factory automation applications), reliabilities of at least 99.999% (e.g., for automotive traffic control applications such as platooning), and user equipment densities of tens of millions of devices per square kilometer (e.g., to support cellular IoT applications). Communication systems that operate according to the 5G standards are also expected to provide wireless access and fixed (or wired) access on an equal footing, which is referred to herein as fixed-mobile convergence. User equipment will therefore be able to perform hybrid access by connecting to the 5G communication system via concurrent fixed and wireless connections.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
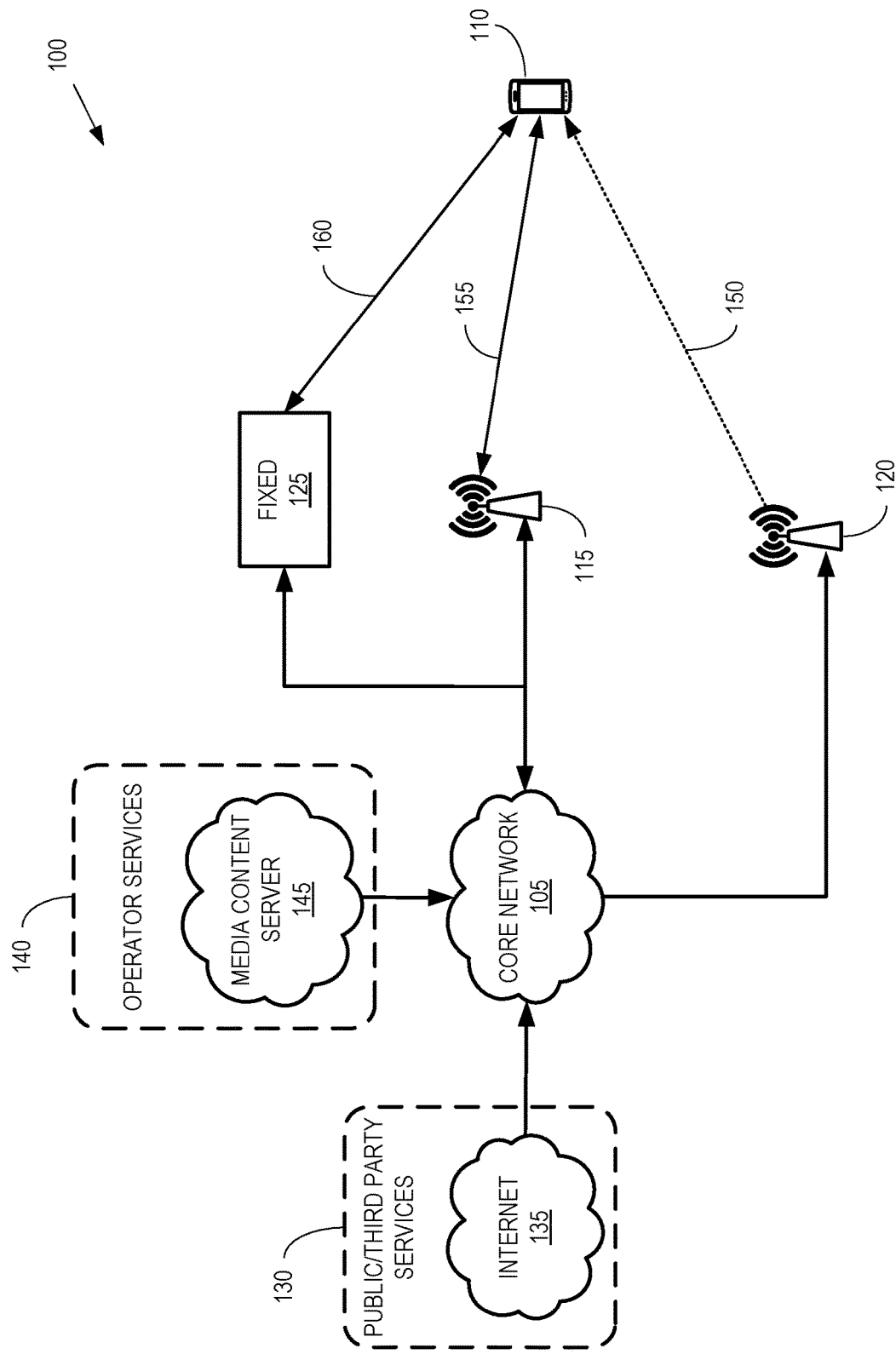
FIG. 1 is a block diagram of a first example of a communication system that supports the provision of complementary content using multiple networks according to some embodiments.

Multimedia broadcast/multicast services (MBMS) are used to transport the same content to one or more users using shared resources of the wireless communication system to enable resource efficient content distribution. Conventional MBMS systems support broadcasting content to all of the users within the coverage area of a cell, multicasting content to a subset of the users within the coverage area of the cell that are indicated by a multicast service identifier, or unicasting content to individual users within the coverage area the cell based on endpoint identifiers of the users. The content provided by conventional MBMS systems is primarily television broadcasts and public safety announcements provided by public warning systems and mission critical communication systems, which can be provided by legacy broadband networks. The radio resources consumed by content delivered via MBMS is expected to increase steadily over time due to improvements in content quality requirements and corresponding increases in time criticality requirements. For example, advanced video and audio codecs enhance the quality of experience of end users, but network operators need to allocate more radio resources to efficiently and effectively deliver this content to the end user. The scarcity of spectral resources makes the delivery of high-quality MBMS content over the air increasingly challenging, especially when the media is broadcast or multicast over a wide area.

In 5G communication systems, broadcasting, multicasting, and unicasting is collectively referred to as XCasting, which can be supported with different types of networks. For example, terrestrial networks coordinate transmissions from base stations such as 5G gigabit NodeBs (gNBs) to broadcast or multicast MBMS content to user equipment. The terrestrial network can multicast or broadcast information concurrently to multiple cells over a synchronized multicast-broadcast single-frequency network (MBSFN). However, terrestrial networks are not able to transmit unicast content to user equipment. Mobile networks are able to broadcast, multicast, or unicast content over an air interface from a base station to the user equipment. Fixed networks are physically connected to the communication system, e.g., using wires or optical fibers. Fixed networks can broadcast, multicast, or unicast content over an air interface using an access point that operates according to a wireless access technology such as Wi-Fi to provide the final leg to the user equipment. User equipment in the wireless communication system implement multiple radios for receiving MBMS transmission via terrestrial, mobile, or fixed connections.

The coverage and capacity of a communication system is improved by using different types of networks to Xcast complementary content to user equipment, which can efficiently combine the data provided by the different types of networks. A user equipment detects that signal quality for multicast/broadcast content received from a first network is below a threshold quality level and, in response to detecting the low signal quality, initiates configuration of a second network for provision of complementary content concurrently with the first network providing the multicast/broadcast content. In some embodiments, the threshold quality level is configured in the user equipment or signaled by the network infrastructure nodes. Some embodiments of the user equipment are able to detect the lowering of quality by detecting packet losses, transmission interruptions, etc. The user equipment combines the multicast/broadcast content received from the first network with the complementary content received from the second network. The first network does not support unicasting content, e.g., the first network can be implemented as a terrestrial network. In that case, the first network includes synchronized base stations that multicast or broadcast information concurrently over a multicast-broadcast single-frequency network (MBSFN). The second network is implemented as a mobile network or a fixed network that uses a wireless access technology to provide a final leg to the user equipment.

In some embodiments, the MBSFN can be expanded by adding one or more base stations from a second network to the MBSFN supported by the first network in response to the user equipment initiating configuration of the second network. The complementary content provided by the second network is the same as the content provided by the first network after the second network has been added to the MBSFN. The same content is therefore transparently provided to the user equipment by the first and second networks in complementary MBSFN sessions. In some embodiments, the first network and the second network form a pseudo-MBSFN in which the first network multicasts or broadcasts content to the user equipment and the second network unicasts complementary content to the user equipment, using the same radio parameters and physical resources as the first network. Parameters for unicasting the complementary content are signaled to the second network by the user equipment or by a content server that receives the parameters via application layer signaling from the user equipment. In this case, the complementary content provided by the second network can differ from the content provided by the first network. For example, if video content is encoded into multiple layers using scalable video coding, the first network can provide a base layer to represent the video content at the lowest available quality and the second network can provide one or more upper layers to enhance the quality of the video content received by the user equipment.

Configuration of the first network is modifiable dependent upon whether one or more second networks are available to provide complementary content. For example, transmission parameters of one or more base stations in the first network can be modified in response to adding base stations in the second network to the MBSFN supported by the first network or removing base stations in the second network from the MBSFN. For another example, transmission parameters of one or more base stations in the first network can be modified in response to configuring one or more base stations in the second network to unicast complementary content to the user equipment. The configuration of the first and second networks can also be modified in response to changes in a distribution of the user equipment in the geographic region served by the first network or the second network. For example, the first and second networks can be configured to support a single MBSFN coverage area based on a distribution of user equipment. If the distribution of the user equipment changes, e.g., one or more user equipment moves closer to the corresponding base stations in the second network, the second network can be removed from the MBSFN and reconfigured to unicast complementary content to the user equipment that have moved closer to the corresponding base stations.

FIG. 1 is a block diagram of a first example of a communication system 100 that supports the provision of complementary content using multiple networks according to some embodiments. The communication system 100 provides support for both mobile and fixed access. As used herein, the term "mobile access" refers to accessing a communication system (e.g., the communication system 100) over an air interface. Mobile access can therefore be referred to as wireless access, mobile communication, wireless communication, or other similar terms. The term "fixed access" refers to accessing to a communication system using a device that is physically connected to the communication system, e.g., accessing a communication system such as the communication system 100 via wires, optical fibers, and the like. Fixed access can therefore be referred to as wireline access, wired communication, or other similar terms. In some embodiments, the final leg of a fixed access connection can be provided by a wireless access point such as a Wi-Fi access point. The communication system 100 supports hybrid access that allows devices to concurrently access the communication system 100 using mobile access and fixed access.

The communication system 100 includes a core network 105 that is accessible by either mobile or fixed devices using a common user plane access and a control plane that supports common authentication, authorization, and accounting (AAA) and policy control. As used herein, the phrase "user plane" refers to a portion of a routing architecture that performs routing of packets that arrive on an inbound interface. For example, the user plane can be implemented using routing tables to determine a path from the inbound interface through a forwarding fabric to the proper outgoing interface. The user plane can also be referred to as a data plane or a forwarding plane. As used herein, the phrase "control plane" refers to a portion of the routing architecture that defines a network topology. For example, the control plane can be used to configure the routing tables that are used to forward packets on the user plane. Control plane logic can also be used to establish priority or quality-of-service for the packets or to identify packets that should be discarded.

Some embodiments of the core network 105 include an access and mobility management function (AMF) that manages access control and mobility for devices in the communication system 100, a session management function (SMF) to set up and manage sessions in the communication system 100 according to network policies, one or more user plane functions (UPF) that can be deployed in the communication system 100 to provide services to users of the communication system 100, and a unified data manager (UDM) that processes credentials, location management, subscription management, and the like. Some embodiments of the core network 105 include other functionality such as a policy control function, application function, and a network function repository function. Some embodiments of the core network 105 are implemented using network function virtualization and software defined networking, as discussed herein. For example, different network slices can be used to instantiate different instances of the AMF, the SMF, the UPF, or the UDM for different users or devices, applications, or use cases.

In the illustrated embodiment, the core network 105 is a converged network that provides network access to user equipment 110 via multiple networks including terrestrial networks, mobile networks, and fixed networks. For example, the user equipment 110 can access the core network 105 via a base station 115, which can be implemented as a 5G gigabit NodeB (gNB) in accordance with standards defined by the 3GPP. For another example, the user equipment 110 can access the core network 105 via a base station 120, which can be implemented as a Terrestrial Broadcast 5G gNB in accordance with standards defined by the 3GPP. Some embodiments of the base stations 115, 120 are also configured to communicate according to Long Term Evolution (LTE), Fourth Generation (4G) standards, or prior generations of standard. Some embodiments of the techniques disclosed herein are independent of the technology of standards implemented in the physical network nodes or virtual network functions. Terrestrial networks are used to support broadcast and are not configured to support unicast to individual user equipment. For yet another example, the user equipment 110 can access the core network 105 via a fixed network 125, which includes an access point such as a Wi-Fi access point (not shown in FIG. 1) to provide the last leg by unicasting content to the user equipment 110. The architecture of the communication system 100 shown in FIG. 1 supports efficient combinations of the unicast, multicast, or broadcast delivery of content (collectively referred to herein as Xcast). Internet Protocol (IP) packets can be used for the unicasting, multicasting, or broadcasting.

Content is generated for the user equipment 110 at different sources. Public or third-party services 130 are provided via the Internet 135, which transmits packets of content to the core network 105 for distribution to the user equipment 110 by unicast, multicast, broadcast, or a combination thereof. Mobile network operators provide additional services 140 via one or more media content servers 145, which generate content that is transmitted to the core network 105 for distribution to the user equipment 110. Examples of content provided to the user equipment 110 includes television broadcasts and public safety communication including public warning systems and mission critical communication systems.

The coverage and capacity of the communication system 100 is improved by using different types of networks to multicast, broadcast, or unicast complementary content to the user equipment 110. In some embodiments, the user equipment 110 detects that signal quality for multicast/broadcast content received from a first network (such as the terrestrial network that includes the base station 120) is below a threshold quality level. For example, the user equipment 110 can measure a signal strength of a signal received from the base station 120 over the air interface 150 and compare the measured signal strength to a threshold. Other measures of signal quality can also be used. In response to detecting the low signal quality, the user 110 initiates configuration of one or more other networks, such as the mobile network that includes the base station 115 or the fixed network 125, for provision of complementary content concurrently with the first network providing the multicast/broadcast content. For example, the base station 115 or the fixed network 125 can be configured to transmit complementary content over the air interfaces 155, 160, respectively. The user equipment 110 combines the multicast/broadcast content received from the first network with the complementary content received from the second network to generate higher quality content that would have been received from the first network alone.

Figure 2:
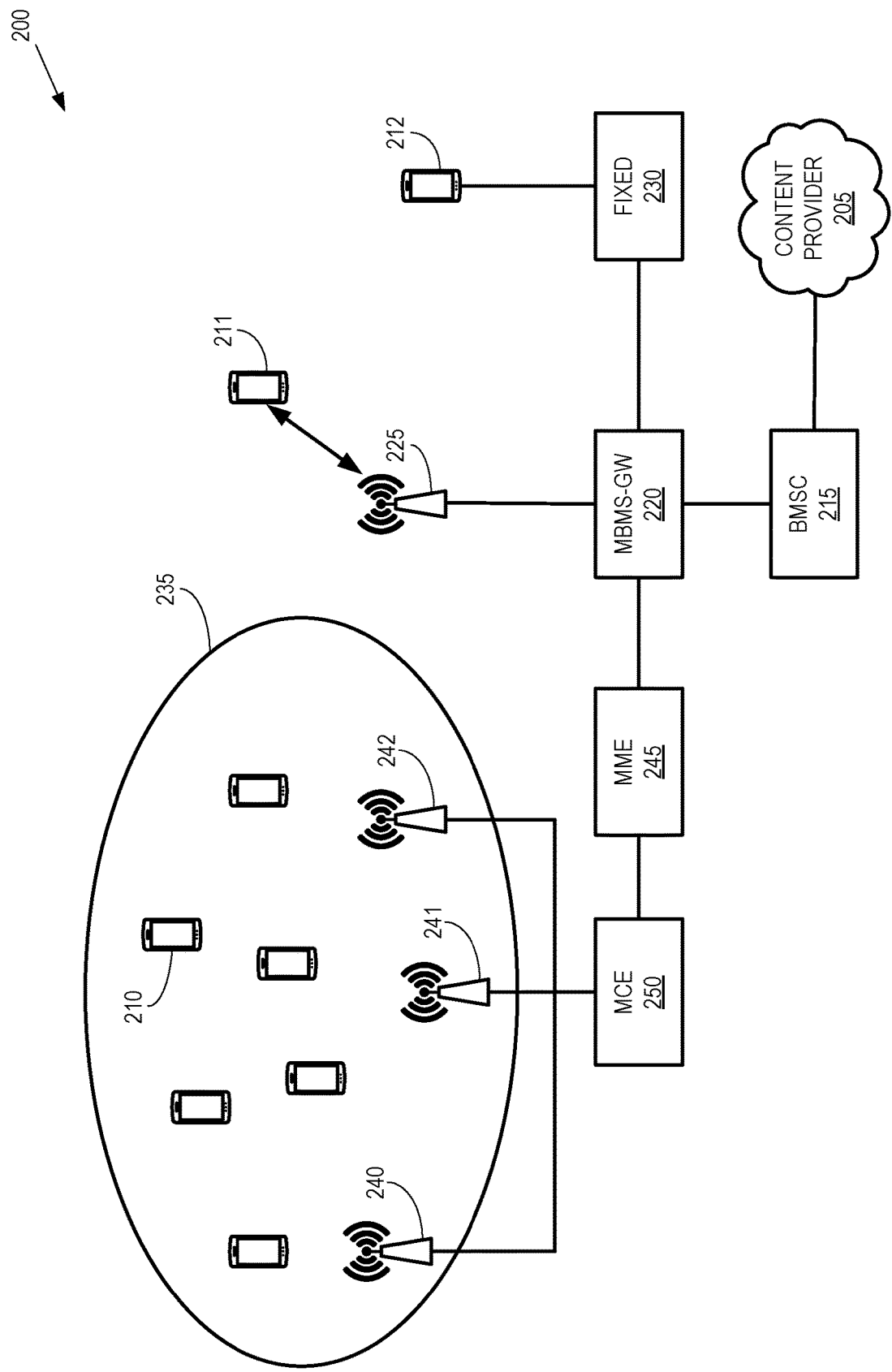
FIG. 2 is a block diagram of a second example of a communication system that supports the provision of complementary content using multiple networks according to some embodiments.

FIG. 2 is a block diagram of a second example of a communication system 200 that supports the provision of complementary content using multiple networks according to some embodiments. The communication system 200 includes a content provider 205 that generates or provides content for distribution to user equipment 210, 211, 312 (collectively referred to herein as "the user equipment 210-212"). The content provider 205 can be implemented as a single server or using a distributed set of servers that are coordinated to provide content for distribution to the user equipment 210-212. In some embodiments, the content includes video content, which can be encoded using scalable video encoding that includes the video content in multiple layers including a base layer and one or more upper layers that can be combined with the base layer to form a higher-quality video presentation. The content is provided to a broadcast multicast service center (BMSC) 215, which is responsible for authentication and authorization of the user equipment 210-212 and the content provider 205, user charging, and the like.

The BMSC 215 provides content to a network gateway such as an MBMS gateway (MBMS-GW) 220, which is responsible for distributing the content to the user equipment 210-212. The MBMS gateway 220 controls MBMS session initiation, modification, and termination. Some embodiments of the MBMS gateway 220 are endpoints for service flows used to convey packets including the content to the user equipment 210-212. For example, the MBMS gateway 220 can provide the content to a base station 225 (such as a 5G gigabit NodeB, gNB) for broadcasting, multicasting, or unicasting to the user equipment 211 using an endpoint identifier of the user equipment 211. For another example, the MBMS gateway 220 can provide the content to a fixed network 230 for unicasting to the user equipment 212 using an endpoint identifier of the user equipment 212, possibly using IP multicast packets. As discussed herein, the connection between the fixed network 230 and the user equipment 212 can be formed using a wired connection or using an access point to provide the final leg.

The communication system 200 also supports a multicast broadcast SFN (MBSFN) within an MBSFN area 235. In the MBSFN, transmitters including multiple time-synchronized base stations 240, 241, 242 (collectively referred to herein as "the base stations 240-242") simultaneously or concurrently transmit the same signal representative of the same content over the same frequency channel to the user equipment 210 (only one user equipment in the MBSFN area 235 is indicated using a reference numeral in the interest of clarity) within the MBSFN area 235 using corresponding endpoint identifiers. The user equipment 211 combines the signals received from the base stations 240-242 to enhance the overall signal quality. In the illustrated embodiment, the base stations 240-242 are deployed for dedicated broadcast network operation, with possible full-carrier utilization and extended cyclic prefix support. The base stations 240-242 can also be configured to use high power, high-tower modes of operation that support higher transmit powers and larger coverage footprints. The base stations 240-242 are therefore part of a terrestrial network that is not configured to support unicast transmissions within the MBSFN area 235.

The MBMS gateway 220 provides content for broadcasting or multicasting within the MBSFN area 235 via a mobility management entity (MME) 245 and a multi-cell/multicast coordination entity (MCE) 250. The MME 245 is a control plane entity that supports non-access stratum (NAS) signaling, gateway selection, roaming, authentication, bearer management, and the like. The MCE 250 provides admission control and allocation of radio resources for the base stations 240-242 within the MBSFN area 235.

Some embodiments of the communication system 200 are implemented as a converged network that provides interworking between the fixed network 230, the base station 225, and the MBSFN. The converged network can therefore multicast, broadcast, or unicast content generated by the content provider 205 to the user equipment 210-212 via the fixed network 230, the base stations 225, 240-242, or a combination thereof.

In some embodiments, the terrestrial network including the base stations 240-242 multicasts or broadcasts content, which is complemented by additional content transmitted by other networks such as the mobile network including the base station 225 or the fixed network 230. For example, one of the user equipment 210-212 transmits a request to configure the mobile network (including the base station 225) to transmit complementary content associated with multicast or broadcast content received at the user equipment 210-212 from the terrestrial network including the base stations 240-242. The phrase "multicast or broadcast content" refers to either multicast content or broadcast content, which are transmitted or received separately. Thus, multicast content can be transmitted without transmitting broadcast content and broadcast content can be transmitted without transmitting multicast content. In some cases, the request is transmitted in response to the user equipment 210-212 detecting that a quality of a signal received from the terrestrial network is below a threshold. In response to receiving the request, the mobile network is configured to transmit the complementary content. The complementary content is transmitted from the base station 225 in the mobile network concurrently with the base stations 240-242 transmitting the multicast or broadcast content from the terrestrial network. The user equipment 210-212 combines the complementary content received from the mobile network with the multicast or broadcast content received from the terrestrial network.

In some embodiments, the user equipment 210-212 trigger concurrent provision of content by a terrestrial network and the mobile network in response to the user equipment 210-212 detecting poor/insufficient quality from the terrestrial network. In that case, the user equipment 210-212 transmit a request for complementary content delivery through the mobile network. The terrestrial network (TN) could trigger SFN service area setup with the mobile network in order to enable resource efficient delivery of broadcast content. The MCE 245 coordinates with mobile network-gNB 225 to coordinate radio parameters for a common MBSFN service area, as discussed in detail below. The converged core network enables connectivity between TN entities and core network entities such as BMSC 215 and MBMS-GW 220 with the gNB 225 for coordinated broadcast content delivery. In some cases, the requests are sent through the application layer—optionally including location information or serving cell information, e.g., serving cell identifiers, public land mobile network (PLMN) information, etc.—to enable MCE 250 to setup the MBSFN service area with minimal delay with the appropriate gNB 225. The gNB 225 serving a particular MBSFN service area could be from a different MNO/PLMN ID.

In some embodiments, the user equipment 210-212 trigger concurrent provision of content by a terrestrial network and a fixed network 230 in response to the user equipment 210-212 detecting poor/insufficient quality from the terrestrial network. For example, the user equipment 210-212 could transmit a request for complementary content delivery through the fixed network 230. Scalable video coding can be used to encode video content to provide a base layer that is transmitted by the gNB 240-242 and upper layers that are transmitted from either gNB 225 or the fixed network 230. For example, transmitting the base layer via the terrestrial network provides standard video quality for users with only TN coverage. For another example, transmitting complementary content including one or more upper layers via the mobile network or the fixed network 230 provides high-definition HD/4k quality for user equipment 210-212 that receive the complementary content from the gNB 225 or the fixed network 230. Alternately, the user equipment 210-212 could trigger the availability of fixed network connectivity and in response, the terrestrial network adjusts radio transmission parameters within the broadcast service area 235 to optimize radio resource utilization while ensuring coverage and capacity for user equipment that are outside the coverage area of other alternate networks. The terrestrial network could also optionally decide to stop broadcast transmissions if all the user equipment 210-212 have connectivity via either the mobile network or the fixed network 230. The resulting unused TN spectrum could be re-farmed for mobile network operations.

Figure 3:
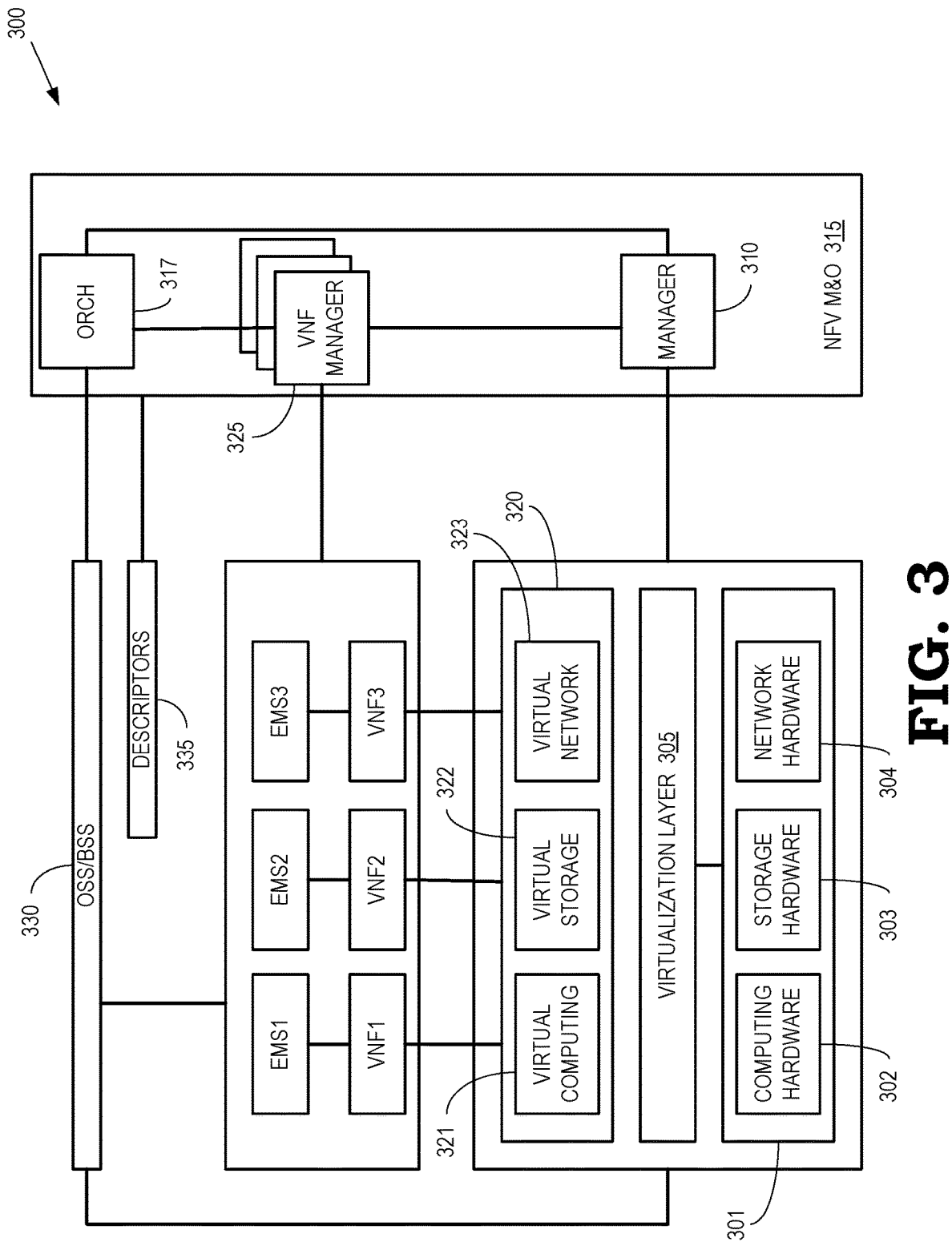
FIG. 3 is a block diagram of a network function virtualization (NFV) architecture according to some embodiments.

FIG. 3 is a block diagram of an NFV architecture 300 according to some embodiments. The NFV architecture 300 is used to implement some embodiments of the communication system 100 shown in FIG. 1. The NFV architecture 300 includes hardware resources 301 including computing hardware 302, storage hardware 303, and network hardware 304. A virtualization layer 305 provides an abstract representation of the hardware resources 301. The abstract representation supported by the virtualization layer 305 can be managed using a virtualized infrastructure manager 310, which is part of the NFV management and orchestration (M&O) module 315. Some embodiments of the manager 310 are configured to collect and forward performance measurements and events that may occur in the NFV architecture 300. For example, performance measurements may be forwarded to an orchestrator (ORCH) 317 implemented in the NFV M&O 315. The hardware resources 301 and the virtualization layer 305 implement virtual resources 320 including virtual computing resources 321, virtual storage resources 322, and virtual networking resources 323.

Virtual networking functions (VNF1, VNF2, VNF3) run over the NFV infrastructure (e.g., the hardware resources 301) and utilize the virtual resources 320. For example, the virtual networking functions (VNF1, VNF2, VNF3) may be implemented using virtual machines supported by the virtual computing resources 321, virtual memory supported by the virtual storage resources 322, or virtual networks supported by the virtual network resources 323. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 325 that exchanges information and coordinates actions with the manager 310 or the orchestrator 317.

The NFV architecture 300 may include an operation support system (OSS)/business support system (BSS) 330. The OSS/BSS 330 deals with network management including fault management using the OSS functionality. The OSS/BSS 330 also deals with customer and product management using the BSS functionality. Some embodiments of the NFV architecture 300 use a set of descriptors 335 for storing descriptions of services, virtual network functions, or infrastructure supported by the NFV architecture 300. Information in the descriptors 335 may be updated or modified by the NFV M&O 315.

The NFV architecture 300 is used to implement some embodiments of the communication system 100 shown in FIG. 1 and the communication system 200 shown in FIG. 2. For example, the NFV architecture 300 can be used to implement network slices that provide control plane functions or user plane functions which are implemented in some embodiments of the core network 105 shown in FIG. 1. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 300 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 4:
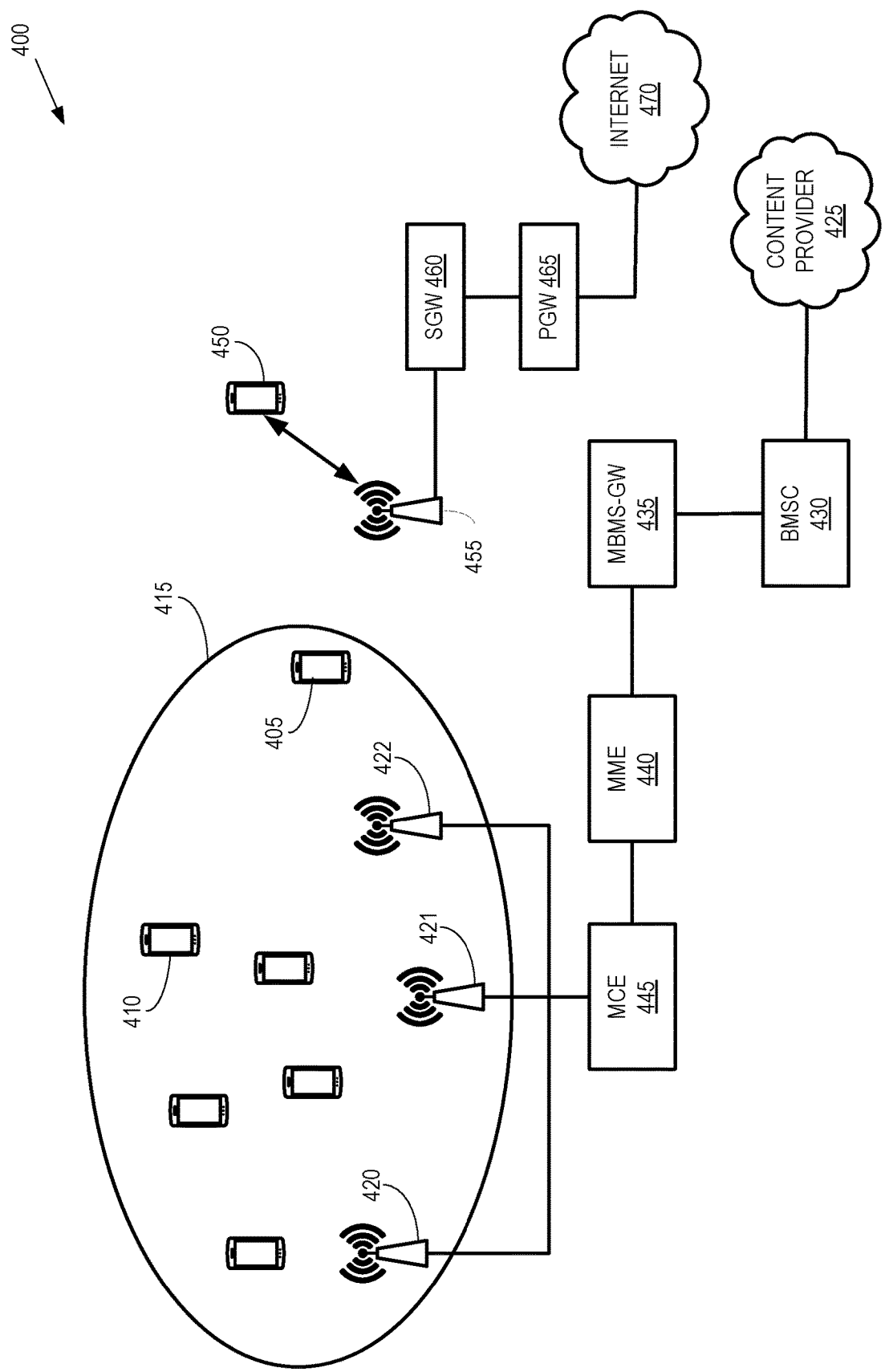
FIG. 4 is a block diagram of a third example of a communication system that supports the provision of complementary content using multiple networks according to some embodiments.

FIG. 4 is a block diagram of a third example of a communication system 400 that supports the provision of complementary content using multiple networks according to some embodiments. In the situation illustrated in FIG. 4, the communication system 400 is providing multicast or broadcast content to user equipment 405, 410 within an MBSFN 415, e.g., using a terrestrial network that includes base stations 420-422. A content provider 425 generates or provides content for distribution to the user equipment 405, 410 via BMSC 430, MBMS-GW 435, MME 440, and MCE 445, which are configured and operated in the same manner as the corresponding entities in FIG. 2. The communication system 400 is also unicasting content to user equipment 450 via a base station 455 in a mobile network that includes a serving gateway 460 and a packet data node (PDN) gateway 465, which receives content from the Internet 470. The MCE 440 and core network entities including the BMSC 430 and the MBMS-GW 435 support multi-network or operator independent connectivity with the base station 455 so that the terrestrial and mobile networks can be coordinated. For example, the user equipment 405 requests complementary content from the mobile network via the base station 455 in response to detecting poor or insufficient signal quality from the terrestrial network.

Figure 5:
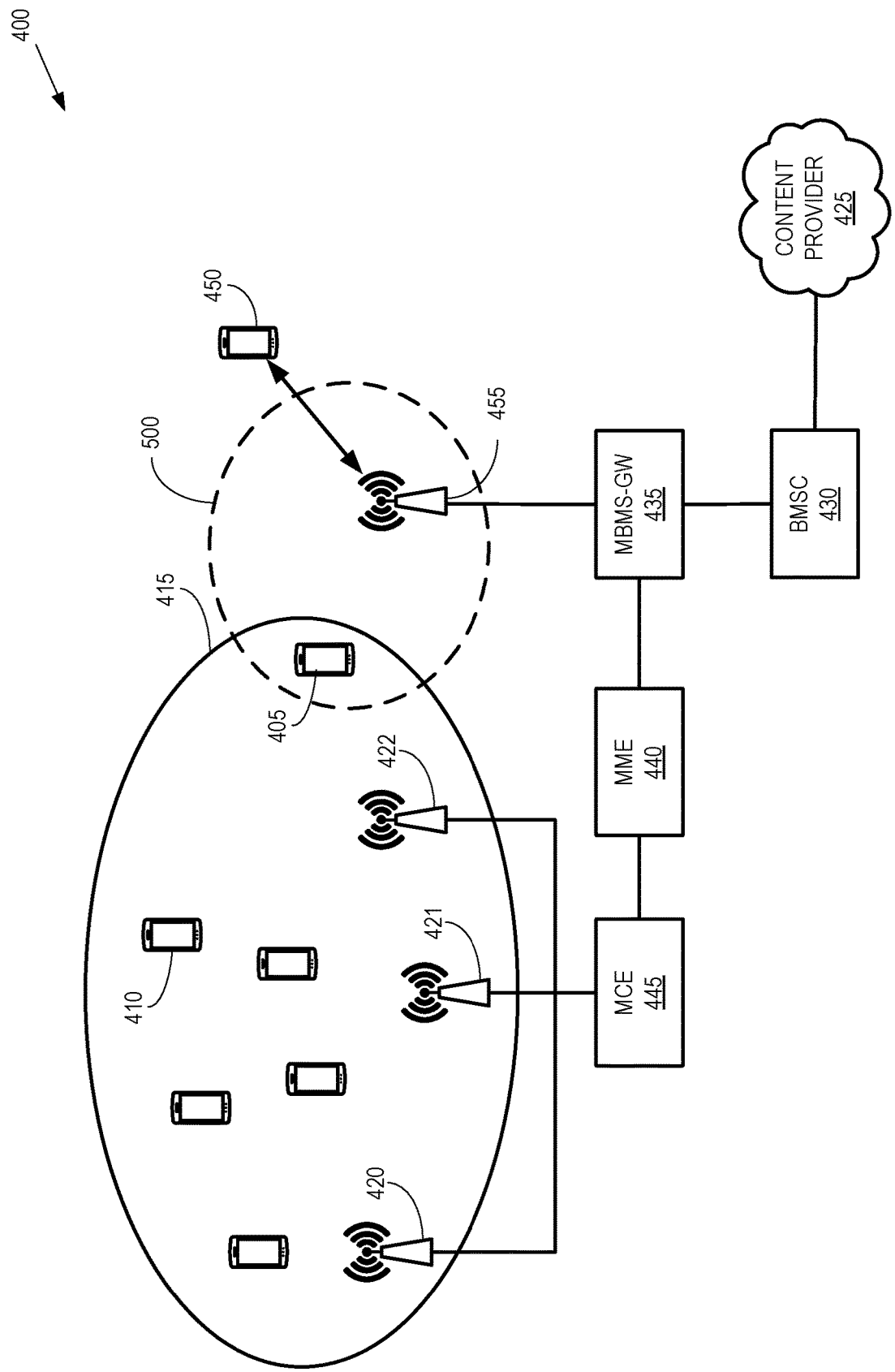
FIG. 5 is a block diagram of the third example of the communication system shown in FIG. 4 after reconfiguration of a mobile network according to some embodiments.

FIG. 5 is a block diagram of the third example of the communication system 400 after reconfiguration of a mobile network according to some embodiments. In response to receiving the request for complementary content from the user equipment 405, the communication system 400 is reconfigured to add the base station 455 from the mobile network to the MBSFN 415 to form an extended MBSFN that includes a coverage area 500 of the base station 455. Adding the base station 455 requires synchronizing the base station 455 with the base stations 420-422. In the illustrated embodiment, the MCE 440 as the base station 455 as a cell within the MBSFN 415 and initiates session set up procedures that include configuring appropriate radio resources and transmission parameters to extend the MBSFN service area 415 to form the extended MBSFN. The user equipment 405 is therefore able to receive better signal quality by combining content transmitted by the base stations 420-422 and the base station 455. In some embodiments, a dedicated terrestrial network broadcasting spectrum can be allocated with enhanced spectrum sharing/licensing regimes with the mobile network. In some cases, the mobile network is able to reuse the unused terrestrial network spectrum within a physical coverage footprint, with possible coverage enhancement assistance in case of signal quality degradation.

Some embodiments of the user equipment 405 report additional information to the network (e.g., to the MCE 440) such as a location for information indicating the strongest available cells detected by the user equipment 405. The signaling can be provided via the base station 455 in the mobile network or using other forms of Internet connectivity. Location information can be used by the converged core and MCE 440 to select the appropriate base stations to enhance the coverage area of the MBSFN 415. In some cases, the enhanced MBSFN service area includes cells that are not part of the serving public land mobile network (PLMN) of the user equipment 455. In a multi-operator setting, the terrestrial network can negotiate explicit network coordination agreements between different mobile network operators and these agreements are then used to set up the enhanced coverage areas. The mobile network operators participating in the agreements should have connectivity with the converged core network of the terrestrial network. Alternately, a demand-based connectivity between MN RAN and TN core network (BMSC 720, MBMS-GW 725, and MME 730) is implemented. Coordinated operation can be enhanced using signaling messages transmitted over interfaces between the entities in the terrestrial network and the mobile network. The enhanced signaling can be used for MBSFN resource coordination, particularly if there are a large number of user equipment receiving unicast transmissions from the mobile network.

Figure 6:
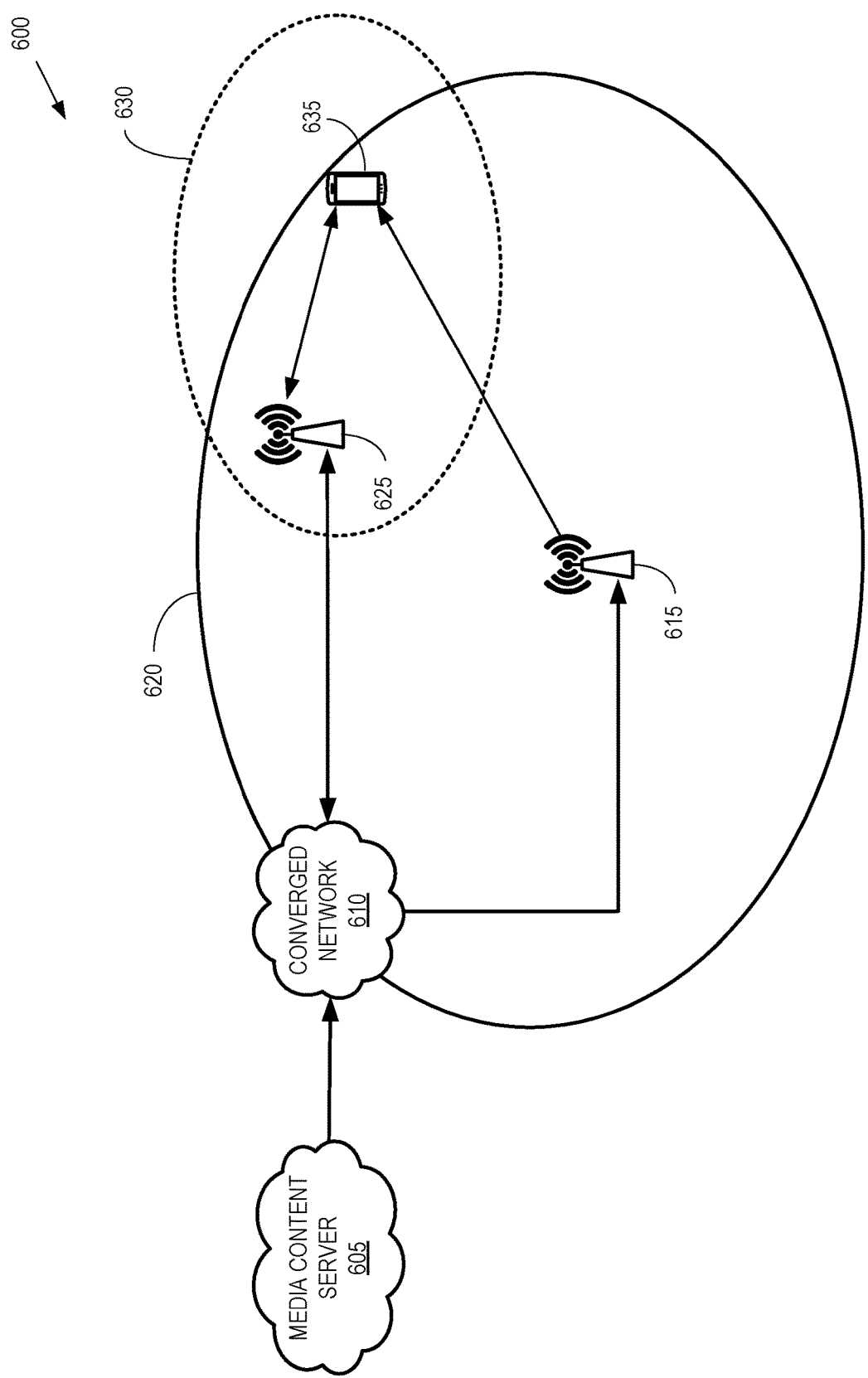
FIG. 6 is a block diagram of a fourth example of a communication system that implements a pseudo-SFN network according to some embodiments.

FIG. 6 is a block diagram of a fourth example of a communication system 600 that implements a pseudo-SFN network according to some embodiments. A content server 605 provides content such as video content to a converged core 610. Multicast or broadcasts content is transmitted from the converged core 610 to a terrestrial broadcast base station 615 that provides coverage within an MBSFN area 620. Complementary content is provided to a base station 625 that is a part of a mobile network and provides coverage within a geographical area 630. In response to a request from a user equipment 635, the base station 615 in the terrestrial network and the base station 625 in the mobile network are coordinated to create a pseudo-SFN based on a coordinated set of operational parameters. In some cases, the coordinated set of operational parameters can be used to allow the base station 625 to join the MBSFN area 620.

Some embodiments of the user equipment 635 provide the operational parameters to the mobile network or the parameters can be transmitted in application layer signaling to the content server 605. The mobile network uses the parameters to configure a unicast bearer for transmitting complementary content to the user equipment 635 in coordination with the terrestrial network transmitting multicast or broadcast content to the user equipment 635. Some embodiments of the terrestrial network optimize the transmission parameters in areas where the complementary mobile network is available. Optimizing the transmission parameters can improve spectral and radio resource utilization efficiency. For example, radio resource efficiency can be optimized for the overall network and coverage can be optimized for individual users such as the user equipment 635.

Figure 7:
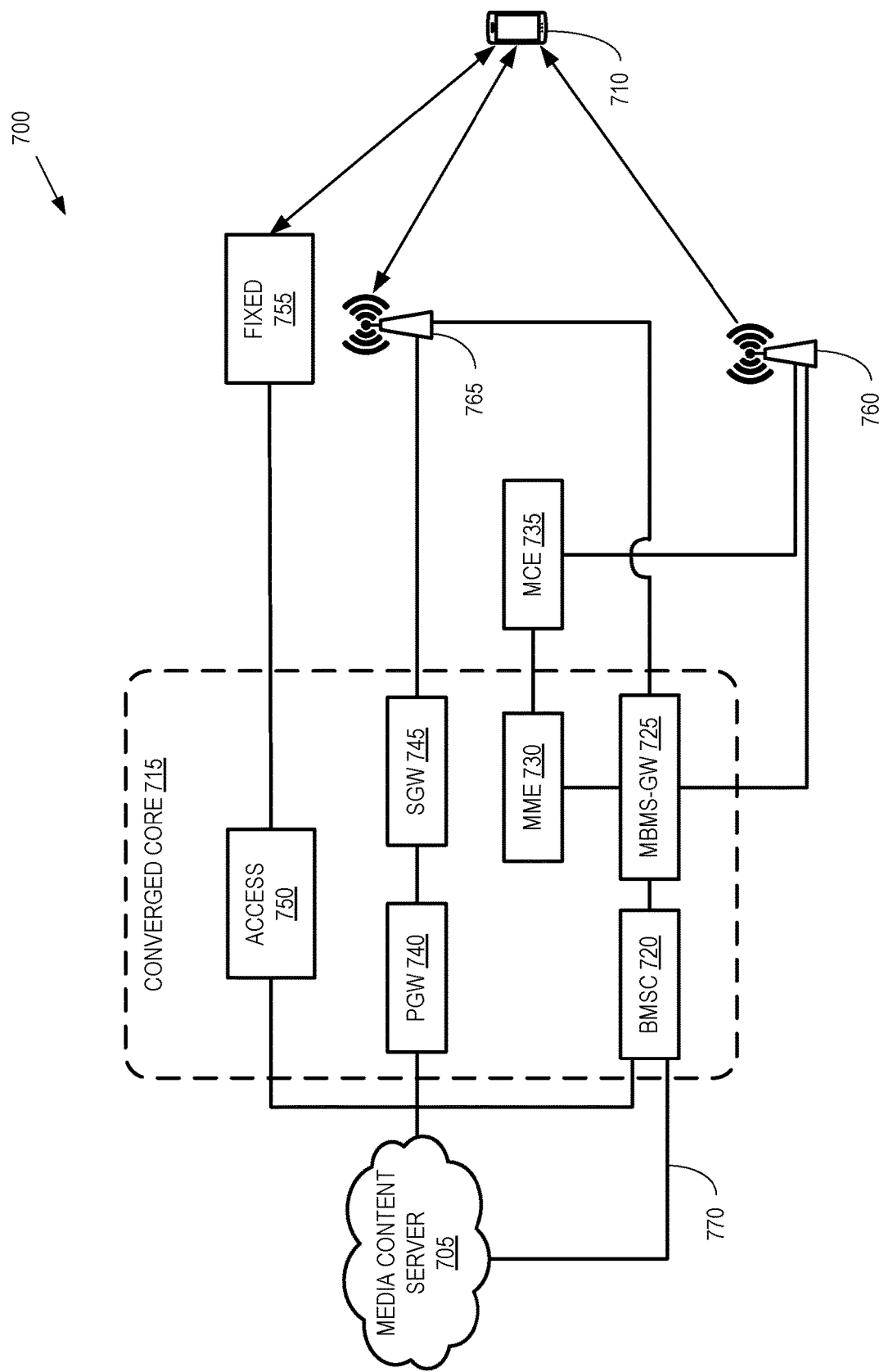
FIG. 7 is a block diagram of a fifth example of a communication system that supports access-agnostic coordination of multiple networks according to some embodiments.

FIG. 7 is a block diagram of a fifth example of a communication system 700 that supports access-agnostic coordination of multiple networks according to some embodiments. A media content server 705 generates or provides content for distribution to the user equipment 710 via a converged core 715. As discussed herein, the converged core 715 includes a BMSC 720, MBMS-GW 725, an MME 730 that is connected to an MCE 735 outside the converged core 715, a PGW 740, and an SGW 745. The converged core 715 also includes subscription and access management functionality 750 that manages subscriptions and access for a fixed network 755. The converged core 715 supports a terrestrial network that includes a base station 760, a mobile network that includes a base station 765, and the fixed network 755.

Some embodiments of the media content server 705 use scalable video coding to encode video content as a base layer and one or more upper layers that can be combined with the base layer to provide higher quality video presentations of the video content. The terrestrial network provides the base layer of the video signal via the base station 760. The mobile network is able to provide the one or more upper layers via the base station 765. The fixed network 755 is also able to provide the one or more upper layers, depending on the configuration of the communication system 700. Coordination between the media content server 705 and the BMSC 720 is necessary to provide timing-synchronized content using hybrid terrestrial/mobile/fixed network access. The media content server 705 therefore provides a synchronization protocol and timing coordination via the connection 770. The timing coordination could be also done using explicit enhancements in the packet headers or signaling using the protocol data units. The fixed network 755, the mobile network, and the BMSC 720 are able to coordinate with the media content server 705 and an application layer client in the user equipment 710 to enable synchronized reception of the base layer and the one or more upper layers. The application layer client in the user equipment 710 is then able to combine the data received using the hybrid access to generate high-quality video streams. Other user equipment that only have terrestrial network coverage are able to receive the base layer, thereby enabling complete coverage for all users in the communication system 700.

In some embodiments that implement access-agnostic coordination of terrestrial, mobile, and fixed networks, parameters of the terrestrial network are optimized based on availability of hybrid access for some or all of the user equipment in the communication system 700. The MBSFN supported by the terrestrial network is designed to ensure coverage and capacity for all users within the network. Incorporating hybrid access with complementary content provided by mobile networks are fixed networks allows additional coverage optimization paradigms, e.g., modifying the operational parameters of the terrestrial network in response to changes in a distribution of user equipment in the communication system 700.

Figure 8:
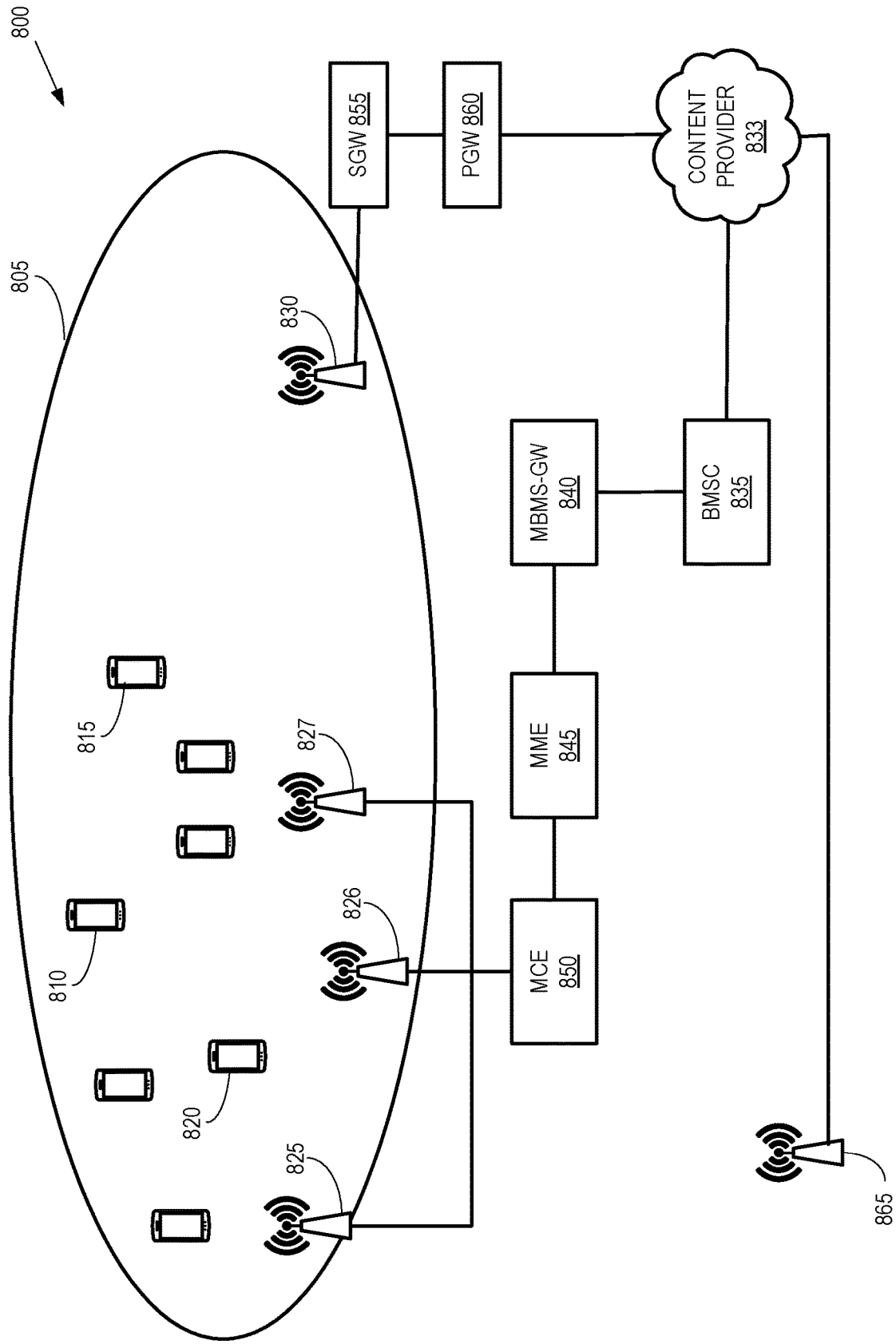
FIG. 8 is a block diagram of a sixth example of a communication system that supports an extended a multicast-broadcast single-frequency network (MBSFN) area using a terrestrial network according to some embodiments.

FIG. 8 is a block diagram of a sixth example of a communication system 800 that supports an extended MBSFN area 805 using a terrestrial network according to some embodiments. In the situation illustrated in FIG. 8, the communication system 800 is providing multicast or broadcast content to user equipment 810, 815, 820 (not all of the user equipment are indicated by reference numerals in the interest of clarity) within the extended MBSFN area 805, e.g., using a terrestrial network that includes base stations 825-827 and a mobile network that includes the base station 830. For example, the extended MBSFN area 805 can correspond to the extended MBSFN area formed by the MBSFN area 415 and the coverage area 500 shown in FIG. 5. A content provider 833 generates or provides content for distribution to the user equipment 810, 815, 820 via BMSC 835, MBMS-GW 840, MME 845, MCE 850, SGW 855, and PGW 860, which are configured and operated in the same manner as the corresponding entities in FIG. 2.

The MBSFN supported by the terrestrial network is configured to provide wide-area coverage when there are a diverse set of users such as the user equipment 810, 815, 820 that are present within the corresponding MBSFN area 805. When the distribution of the user equipment 810, 815, 820 within the MBSFN area 805 changes, the MCE 845 and MBMS-GW 840 use a signaling protocol to optimize the number of active base stations 825-827, 830 and thereby optimize the coverage area, e.g., by changing the boundaries of the MBSFN area 805. The mobile network (or a fixed network that includes the base station 865) can then provide connectivity to the user equipment that are outside the modified MBSFN area.

Figure 9:
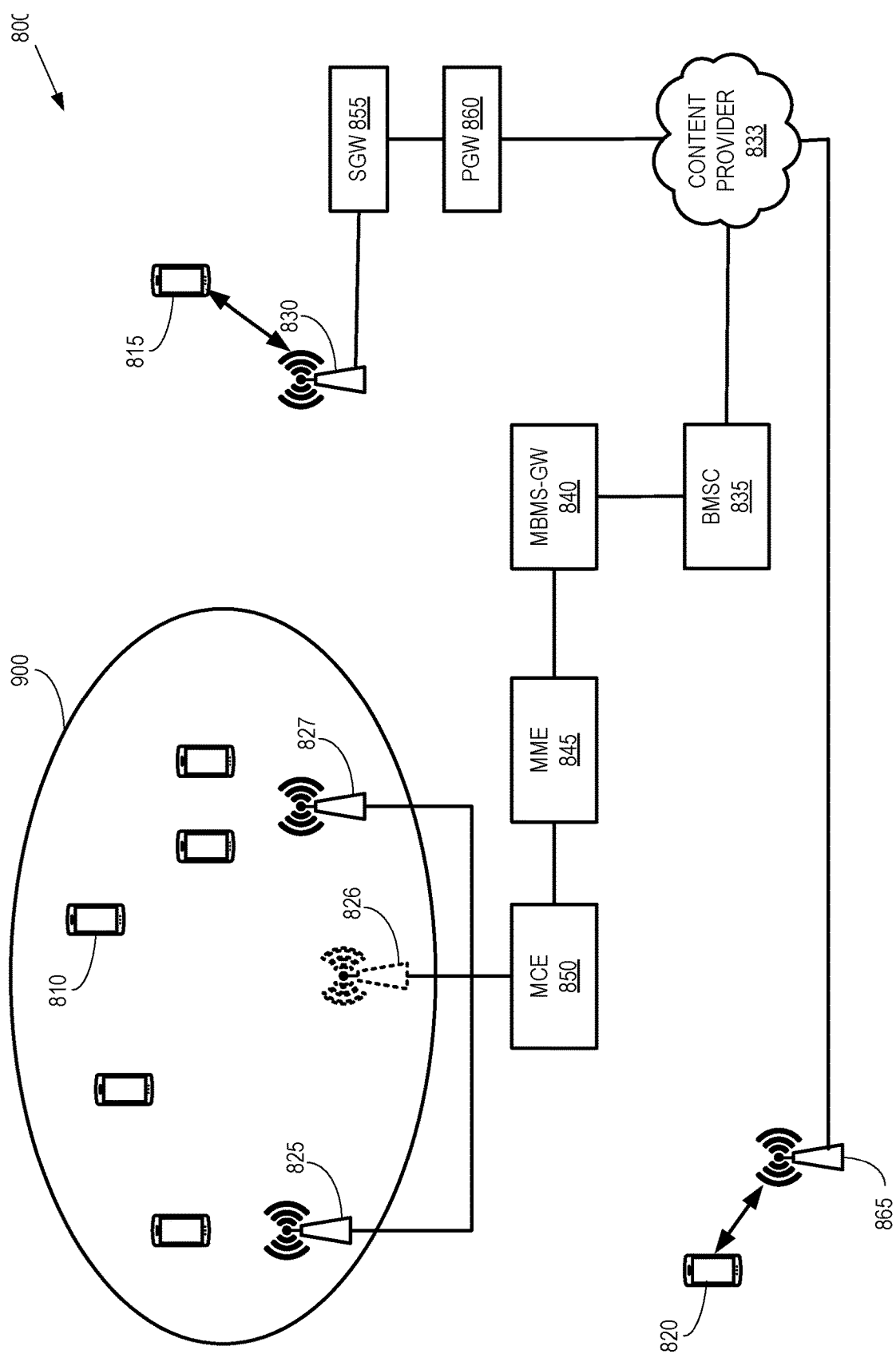
FIG. 9 is a block diagram of the sixth example of the communication system shown in FIG. 8 that supports a modified MBSFN area using a terrestrial network, a mobile network, and a fixed network according to some embodiments.

FIG. 9 is a block diagram of the sixth example of the communication system 800 that supports a modified MBSFN area 900 using a terrestrial network, a mobile network, and a fixed network according to some embodiments. The communication system 800 has been modified (relative to the configuration shown in FIG. 8) in response to a changing distribution of user equipment. For example, the user equipment 815 has moved to a location that is closer to the base station 830 in the mobile network supported by the SGW 855 and PGW 860 and more distant from the base stations 825-827 in the terrestrial network. The base station 830 has therefore been removed from the set of base stations that serves the MBSFN area 805, which modifies the coverage area of the terrestrial network to form the modified MBSFN area 900. The base station 830 is reconfigured as part of the mobile network, which now provides connectivity to the user equipment 815. For another example, the user equipment 820 has moved to a location that is closer to the base station 865 in the fixed network and further from the base stations 825-827 in the terrestrial network. The base station 865 now provides connectivity to the user equipment 820 via the fixed network.

The terrestrial network is also reconfigured in response to the changing distribution of user equipment. For example, the base station 826 is deactivated in response to the reduced number of user equipment within the modified MBSFN area 900, as indicated by the dotted lines representing the base station 826. Some embodiments of the base station 826 can be reconfigured (or re-farmed) to operate as part of the mobile network in response to the terrestrial network deactivating the base station 826. Thus, embodiments of the techniques disclosed herein enable enhanced coordination and operational efficiency in a converged network such as the communication system 800 shown in FIGS. 8 and 9. In the scenario where all the users have connectivity through alternate access, the terrestrial network could switch off the network and re-farm the spectrum for mobile network operation. For example, the base stations 825-827 can be reconfigured for mobile network operation in response to switching off or deactivating the terrestrial network that provides connectivity within the modified MBSFN area 900.

Figure 10:
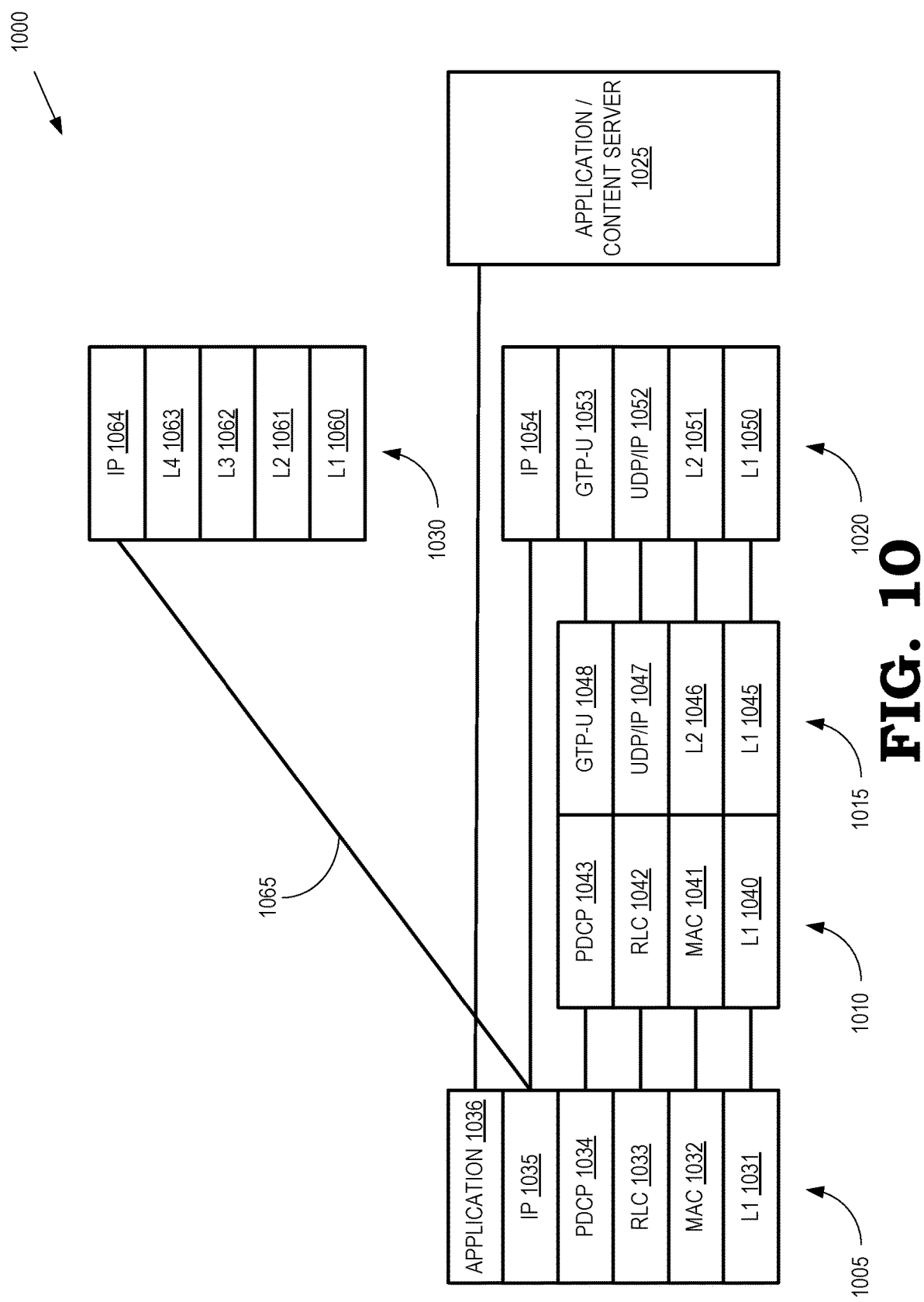
FIG. 10 is a block diagram that illustrates a protocol architecture that is used to support hybrid operation incorporating a terrestrial network and a fixed network.

FIG. 10 is a block diagram that illustrates a protocol architecture 1000 that is used to support hybrid operation incorporating a terrestrial network and a fixed network. In the illustrated embodiment, the fixed network provides complementary content to enhance the content broadcast by the terrestrial network, e.g., using possible IP packet retransmissions. The protocol architecture 1000 includes a user equipment 1005, a base station 1010, an MBMS-GW 1015, a BMSC 1020, and application/content server 1025, and a fixed network 1030.

The user equipment 1005 implements a physical layer (L1) 1031 to support transmission and reception of bit streams over a physical medium, a media access control (MAC) layer 1032 to manage access to the transmission medium, a radio link control (RLC) layer 1033 to encapsulate network layer protocols, a packet data convergence protocol (PDCP) layer 1034 to support transfer of user plane and control plane data, an IP layer 1035 to manage the Internet protocol, and an application layer 1036 to support software applications implemented by the user equipment 1005. The application layer 1036 supports application layer signaling between the user equipment 1005 and the application/content server 1025.

The base station 1010 implements a physical layer 1040, a MAC layer 1041, and RLC layer 1042, and a PDCP layer 1043. These layers are able to communicate with corresponding layers in the user equipment 1005 and the MBMS-GW 1015, which implements a physical layer 1045, a link layer (L2) 1046, a universal datagram protocol (UDP)/IP layer 1047, and a general packet radio service (GPRS) tunneling protocol (GTP-U) 1048 that is used to transport user data within the core network and between a radio access network and the core network. The BMSC 1020 implements a physical layer 1050, a link layer 1051, a UDP/IP layer 1052, a GTP-U layer 1053, and an IP layer 1054, which terminates IP sessions with the corresponding IP layer 1035 in the user equipment 1005.

The fixed network 1030 includes a physical layer 1060, a link layer 1061, a network layer (L3) 1062, a transport layer (L4) 1063, and an IP layer 1064 that supports exchange of IP packets with the corresponding IP layer 1035 in the user equipment 1005 over a fixed network link 1065. In some embodiments, the fixed network link 1065 is used to retransmit PDCP packets encapsulated within IP packets in order to improve the quality of received traffic. In that case, the application 1036 implemented by the user equipment 1005 is configured to select the best packets from among the packets received from the fixed network 1030 and the application/content server 1020.

Figure 11:
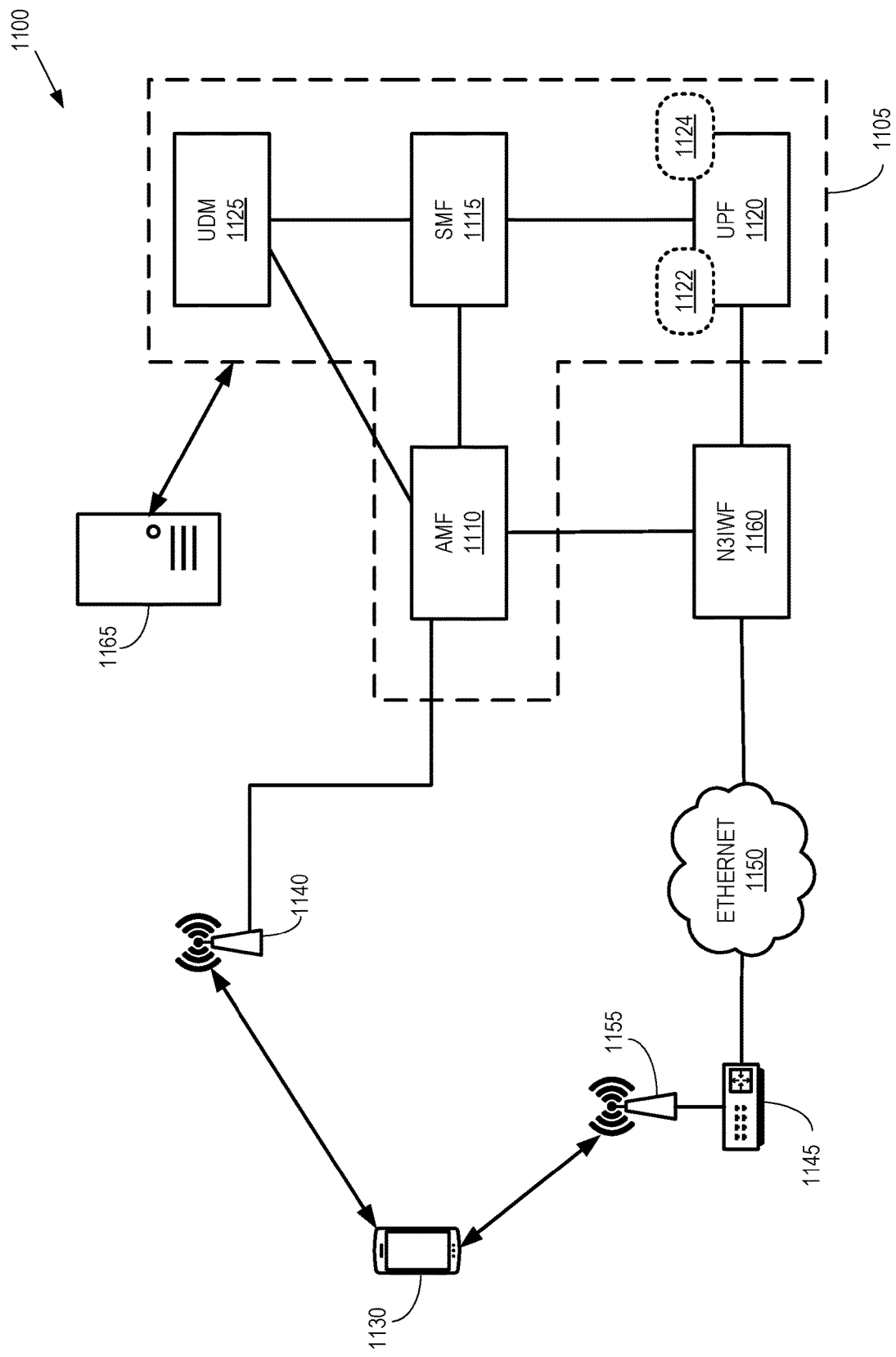
FIG. 11 is a block diagram of a seventh example of a communication system that provides content using multiple networks according to some embodiments.

FIG. 11 is a block diagram of a seventh example of a communication system 1100 that provides content using multiple networks according to some embodiments. The communication system 1100 includes a core network 1105 that includes an access and mobility management function (AMF) 1110 that manages access control and mobility for devices in the communication system 1100. The core network 1105 also includes a session management function (SMF) 1115 to set up and manage sessions in the communication system 1100 according to network policies. An association between user equipment and the core network 1105 can be represented as a packet data unit (PDU) session that can be managed by the SMF 1115. The PDU session supports data connectivity between user equipment and a data network.

The core network 1105 also includes one or more user plane functions (UPF) 1120 that can be deployed in the communication system 1100 to provide services to users of the communication system 1100. The user plane function 1120 can function as an endpoint for service flows that are used to broadcast, multicast, or unicast packets, as discussed herein. The user plane function 1120 can therefore store endpoint identifiers for the service flows. Some embodiments of the user plane function 1120 implement an MBMS-GW 1122 and a BMSC 1124. The core network 1105 further includes a unified data manager (UDM) 1125 that processes credentials, location management, subscription management, and the like. The UDM 1125 stores data including user subscription data, such as subscription identifiers, security credentials, access and mobility related subscription data, and session related subscription data. Some embodiments of the core network 1105 include other functionality such as a policy control function and a network function repository function, which are not shown in FIG. 11 in the interest of clarity. Some embodiments of the core network 1105 are implemented using network function virtualization and software defined networking, as discussed herein. For example, different network slices can be used to instantiate different instances of the AMF 1110, the SMF 1115, the UPF 1120, or the UDM 1125 for different users or devices. Each PDU session is part of one network slice.

The core network 1105 provides network access to user equipment 1130 via a terrestrial network. For example, the user equipment 1130 can access the core network 1105 via a base station 1140 that is connected to the AMF 1110 over a corresponding interface such as an N2 interface. The base station 1140 is also connected to the UPF 1120 by a corresponding interface such as an N3 interface, which is not shown in FIG. 1 in the interest of clarity. The base station 1140 can be implemented as a Terrestrial Broadcast 5G gNB in accordance with standards defined by the 3GPP. The core network 1105 can also provide network access to user equipment 1130 via mobile access, e.g., using a 5G gigabit NodeB (gNB) in accordance with standards defined by the 3GPP, which is not shown in FIG. 11 in the interest of clarity.

The core network 1105 also provides network access to the user equipment 1130 via fixed access. For example, the user equipment 1130 can establish a connection to a residential gateway 1145, which has a wired connection to an Ethernet network 1150. In the illustrated embodiment, a final leg of the fixed access connection between the user equipment 1130 and the core network 1105 is implemented using a wireless access technology. For example, a Wi-Fi access point 1155 can be used to provide the final leg of the fixed access connection. However, in other cases, the user equipment 1130 is connected to the residential gateway 1145 using a wired connection. Some embodiments of the wired connection use line termination devices such as a digital subscriber line access multiplexer (DSLAM) or a gigabit passive optical network (GPON).

An interworking function 1160 is disposed between the Ethernet network 1150 and the core network 1105. The interworking function 1160 can also be referred to as a non-3GPP interworking function (N3IWF). The interworking function 1160 is configured to modify or translate messages conveyed from the fixed access user equipment to the core network 1105 so that the fixed access user equipment appears to be accessing the core network 1105 according to mobile access standards or protocols from the perspective of the core network 1105. The interworking function 1160 is also configured to modify or translate messages conveyed from the core network 1105 to the fixed access user equipment so that the messages received by the fixed access user equipment conform to corresponding fixed access standards or protocols. The interworking function 1160 supports interfaces with the AMF 1110 and the UPF 1120.

A content provider 1165 provides content such as audio, video, or multimedia to the core network 1105 for provision to the user equipment 1130, as well as distribution to other user equipment (not shown in FIG. 11 in the interest of clarity). The content provider 1165 can be implemented using one or more servers. Content generated by the content provider 1165 can be broadcast, multicast, or unicast to the user equipment 130, which enables resource-efficient content distribution. Examples of content that can be broadcast or multicast include television broadcasts and public safety broadcasts such as public warning systems, mission-critical communication systems, and the like. As discussed herein, the content can be distributed to the user equipment 1130 in a coordinated or access-agnostic manner using the terrestrial network (e.g., via the base station 1140) and the fixed network (e.g., via the Wi-Fi access point 1155). In some embodiments, the content can also be distributed to the user equipment 1130 using a fixed network (not shown in FIG. 11).

Figure 12:
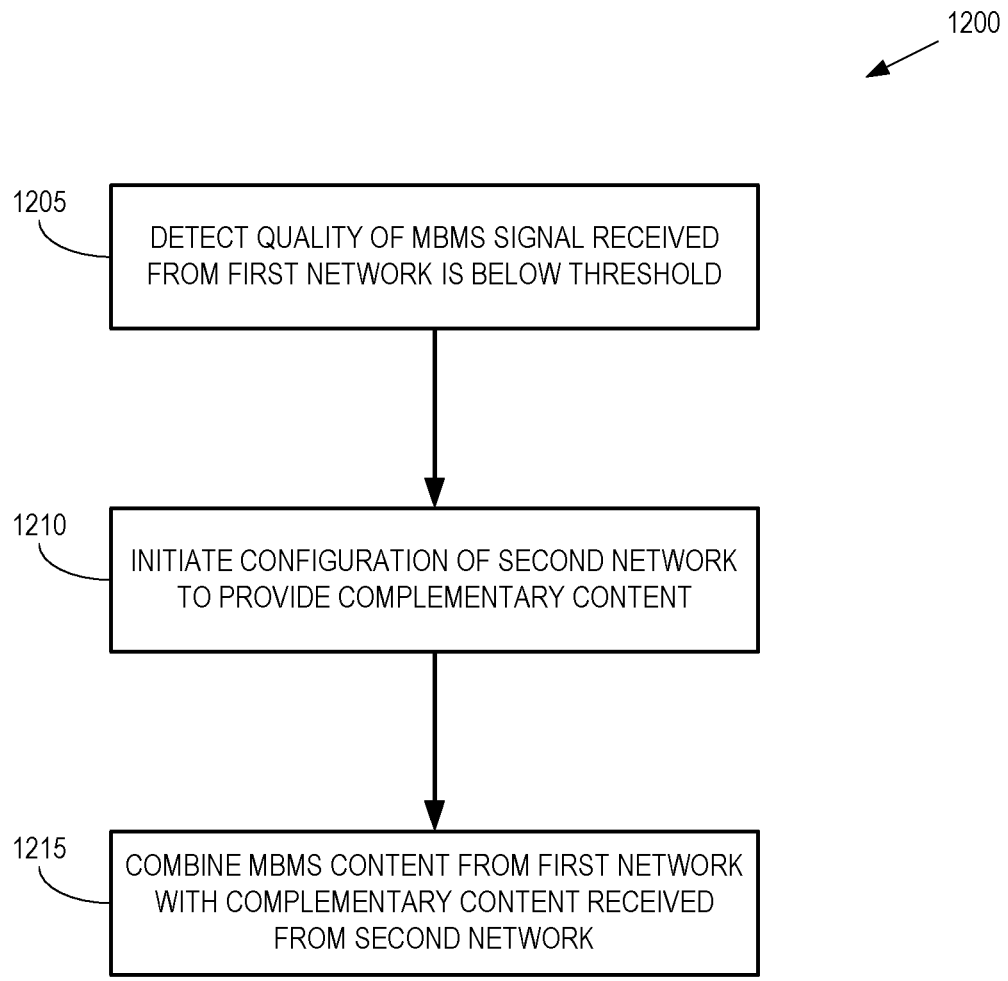
FIG. 12 is a flow diagram illustrating a method of coordinating content distribution by a terrestrial network with complementary content delivered by a mobile or fixed network according to some embodiments.

FIG. 12 is a flow diagram illustrating a method 1200 of coordinating content distribution by a terrestrial network with complementary content delivered by a mobile or fixed network according to some embodiments. The method 1200 is implemented in some embodiments of the communication system 100 shown in FIG. 1, the communication system 200 shown in FIG. 2, the communication system 400 shown in FIG. 4, the communication system 600 shown in FIG. 6, the communication system 700 shown in FIG. 7, the communication system 800 shown in FIG. 8, the protocol architecture 1000 shown in FIG. 10, and the communication system 1100 shown in FIG. 11.

At block 1205, the user equipment measures a quality of an MBMS signal received from a first network such as a terrestrial network. Examples of quality measurements include signal-to-noise ratios, signal-to-interference-plus-noise ratios, received signal strength indicators, bit error rates, and the like. The user equipment determines whether the measure of the quality is below a threshold value. As long as the measure of the quality is below the threshold value, the user equipment takes no action and continues to receive the MBMS signal from the first network. In response to the measure of the quality of the MBMS signal rising above the threshold, the method 1200 flows to block 1210.

At block 1210, the user equipment initiates configuration of a second network, such as a mobile network or a fixed network, to provide complementary content concurrently with the MBMS signal that is being provided by the first network. The user equipment can initiate configuration of the second network by transmitting signaling to a base station in the first network or by transmitting application layer signaling to an application or content server, which forwards the request for configuration of the second network to appropriate entities in the first or second networks. In some embodiments, the second network is configured to operate as part of an MBSFN area supported by the first network, in which case the first and second networks transmit the same content. In some embodiments, the second network is configured to operate as part of the pseudo-MBSFN, e.g., by unicasting the complementary content to the user equipment concurrently with the first network broadcasting content. In that case, the complementary content can be the same or different than the content that is broadcast by the first network.

At block 1215, the user equipment combines the MBMS content received from the first network with the complementary content received from the second network. If the first and second networks are configured to operate as part of the same MBSFN area, the broadcast content and the complementary content are combined transparently at the user equipment. That is, the user equipment may be unaware of the modification of the MBSFN area that results in the improved quality of the MBMS signal due to additional base stations broadcasting the same content. If the second network is configured to unicast complementary content to the user equipment, an application and the user equipment combines the broadcasts content with the complementary content. For example, if the broadcast content represents a base layer generated by encoding video content using scalable video coding and the complementary content represents one or more upper layers of the encoded video content, the application implemented by the user equipment can combine the base layer with the one or more upper layers to generate higher quality video presentations.

Figure 13:
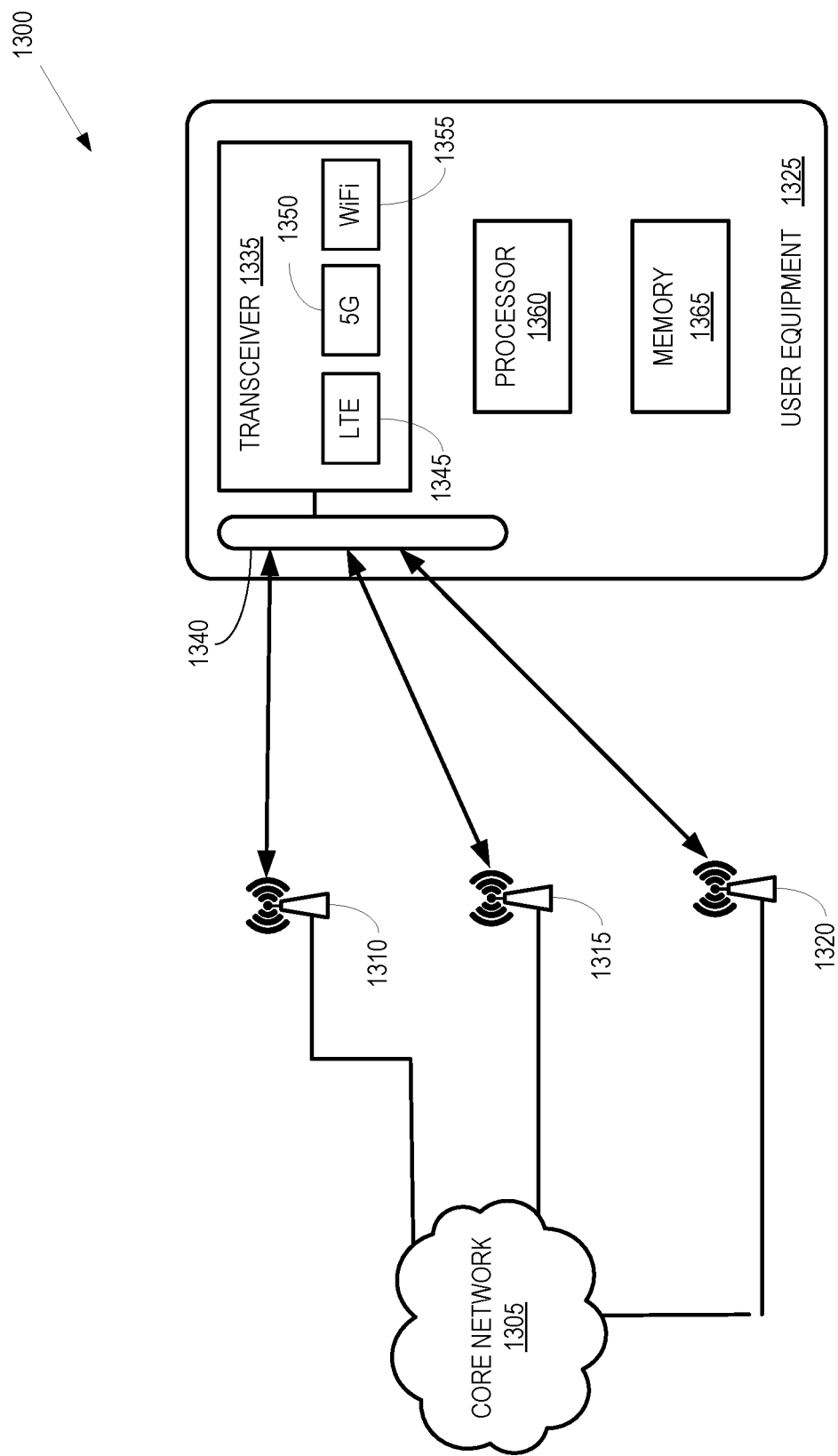
FIG. 13 is a block diagram of an eighth example of a communication system according to some embodiments.

FIG. 13 is a block diagram of an eighth example of a communication system 1300 according to some embodiments. The communication system 1300 includes a core network 1305 that implements a converged network to support communication by multiple networks. For example, the core network 1305 supports a terrestrial network for communication via a base station 1310, a mobile network for communication via a base station 1315, and a fixed network for communication over an air interface supported by an access point 1320 that provides the last leg over the air interface. The core network 1305 can therefore support access-agnostic delivery of multicast, broadcast, or unicast communication to a user equipment 1325. The communication system 1300 represents portions of some embodiments of the communication system 100 shown in FIG. 1, the communication system 200 shown in FIG. 2, the communication system 400 shown in FIG. 4, the communication system 600 shown in FIG. 6, the communication system 700 shown in FIG. 7, the communication system 800 shown in FIG. 8, the protocol architecture 1000 shown in FIG. 10, and the communication system 1100 shown in FIG. 11.

The user equipment 1325 includes a transceiver 1335 for transmitting and receiving signals via antenna 1340. The transceiver 1335 can therefore be implemented as a transmitter and a receiver. Some embodiments of the transceiver 1335 include multiple radios for communicating according to different radio access technologies such as a radio 1345 for communication according to LTE standards, a radio 1350 for communication according to 5G standards, and a radio 1355 for Wi-Fi communication. The transceiver 1335 can also be used to communicate via a wired or wireline connection to a fixed access network. The user equipment 1325 also includes a processor 1360 and a memory 1365. The processor 1360 may be used to execute instructions stored in the memory 1365 and to store information in the memory 1365 such as the results of the executed instructions. Some embodiments of the processor 1360 and the memory 1365 are configured to perform portions of the method 1200 shown in FIG. 12.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving, at a user equipment via a multicast-broadcast single-frequency network supported by a first network, multicast or broadcast content, wherein the multicast-broadcast single-frequency network has an operational parameter associated therewith;
    transmitting, from the user equipment based on a determination that a signal quality of the first network for the multicast or broadcast content fails to satisfy a threshold value, a request to receive complementary content associated with the multicast or broadcast content from a second network,
    transmitting, from the user equipment, an indication of the operational parameter of the multicast-broadcast single-frequency network;
    receiving, at the user equipment via the second network, the complementary content; and
    combining, at the user equipment, the complementary content with the multicast or broadcast content to increase a quality of the multicast or broadcast content.

2. A method comprising:
    transmitting, from a first network toward a user equipment based on a multicast-broadcast single-frequency network supported by the first network, multicast or broadcast content;
    receiving, at the first network, a request by the user equipment to receive from a second network complementary content associated with the multicast or broadcast content;
    triggering, at the first network based on the request by the user equipment, configuration of the second network to provide the complementary content based on the multicast-broadcast single-frequency network; and
    modifying, by the first network based on the configuration of the second network to provide the complementary content based on the multicast-broadcast single-frequency network, the multicast-broadcast single-frequency network supported by the first network.

3. The method of claim 2, wherein the first network comprises a plurality of synchronized base stations that multicast or broadcast content concurrently over the multicast-broadcast single-frequency network, wherein the second network supports unicasting.

4. The method of claim 2, wherein the first network comprises a terrestrial network, wherein the second network comprises a mobile network or a fixed network.

5. The method of claim 2, wherein modifying the multicast-broadcast single-frequency network supported by the first network comprises adding a base station to the multicast-broadcast single-frequency network or removing a base station from the multicast-broadcast single-frequency network.

6. The method of claim 2, wherein modifying the multicast-broadcast single-frequency network supported by the first network comprises modifying at least one transmission parameter of at least one base station supporting the multicast-broadcast single-frequency network.

7. The method of claim 2, wherein the configuration of the second network to provide the complementary content comprises an addition of a base station of the second network to the multicast-broadcast single-frequency network supported by the first network or a removal of a base station of the second network from the multicast-broadcast single-frequency network supported by the first network.

8. The method of claim 2, wherein the configuration of the second network to provide the complementary content comprises configuration of a base station in the second network to unicast the complementary content to the user equipment.

9. The method of claim 2, wherein the multicast-broadcast single-frequency network supported by the first network is modified based on a change in distribution of user equipment in a geographic region served by the first network or the second network.

10. The method of claim 2, wherein triggering the configuration of the second network to provide the complementary content based on the multicast-broadcast single-frequency network comprises:
sending, by the first network toward the second network, an indication of the configuration of the first network to support the multicast-broadcast single-frequency network.

11. The method of claim 2, further comprising:
reconfiguring the second network in response to a change in a distribution of user equipment in a geographic region served by the first network or the second network.

12. The method of claim 11, wherein reconfiguring the second network comprises removing the second network from the multicast-broadcast single-frequency network supported by the first network and reconfiguring the second network to unicast the complementary content to the user equipment.

13. A user equipment comprising:
at least one processor; and
at least one memory storing instructions that, when executed by the at least one processor, to cause the user equipment to:
receive, at the user equipment via a multicast-broadcast single-frequency network supported by a first network, multicast or broadcast content, wherein the multicast-broadcast single-frequency network has an operational parameter associated therewith;
transmit, from the user equipment based on a determination that a signal quality of the first network for the multicast or broadcast content fails to satisfy a threshold value, a request to receive complementary content associated with the multicast or broadcast content;
transmit, from the user equipment, an indication of the operational parameter of the multicast-broadcast single-frequency network;
receive, at the user equipment via the second network, the complementary content; and
combine, at the user equipment, the complementary content with the multicast or broadcast content to increase a quality of the multicast or broadcast content.

14. The user equipment of claim 13, wherein the complementary content is the same as the multicast or broadcast content.

15. The user equipment of claim 13, wherein the complementary content is different than the multicast or broadcast content, and wherein the multicast or broadcast content includes a first portion of a set of content layers and the complementary content includes a second portion of the set of content layers.

16. The user equipment of claim 15, wherein the multicast or broadcast content comprises a base layer formed by scalable video coding of video content and the complementary content comprises at least one upper layer formed by scalable video coding of the video content.

17. The user equipment of claim 13, wherein the first network comprises a terrestrial network, wherein the second network comprises a mobile network or a fixed network.

18. The user equipment of claim 13, wherein the indication of the operational parameter is transmitted as part of the request.

19. The user equipment of claim 13, wherein the indication of the operational parameter is sent toward a base station in the first network.

20. The user equipment of claim 19, wherein the indication of the operational parameter is sent toward an application or content server using application layer signaling.

21. The user equipment of claim 13, wherein the first network comprises a plurality of synchronized base stations that multicast or broadcast content concurrently over the multicast-broadcast single-frequency network, wherein the second network supports unicasting.

22. The user equipment of claim 13, wherein the first network and the second network form a pseudo multicast-broadcast single-frequency network in which the user equipment receives the multicast or broadcast content from the first network via multicast or broadcast and the user equipment receives the complementary content from the second network via unicast.

23. The user equipment of claim 22, wherein the user equipment receives the multicast or broadcast content from the first network via multicast or broadcast and receives the complementary content from the second network via unicast using a common set of radio parameters and physical resources.

24. The user equipment of claim 13, wherein the request is sent toward a base station in the first network.

25. The user equipment of claim 13, wherein the request is sent toward an application or content server using application layer signaling.

* * * * *